United States Patent [19]
Akin et al.

[11] Patent Number: 6,019,275
[45] Date of Patent: Feb. 1, 2000

[54] METHOD AND SYSTEM FOR INTRODUCING FLUX ONTO AT LEAST ONE SURFACE OF A SOLDER PUMP

[75] Inventors: James Sherill Akin, Round Rock; Edward Blakley Menard, Austin; Thomas Alan Schiesser, Austin; Ted Minter Smith, Austin, all of Tex.

[73] Assignee: International Business Machines Corporation

[21] Appl. No.: 09/049,172

[22] Filed: Mar. 27, 1998

[51] Int. Cl.⁷ .............................. B23K 31/02; B23K 1/20
[52] U.S. Cl. .............................. 228/207; 228/36; 228/223
[58] Field of Search .............................. 228/36, 223, 258, 228/259, 207

[56] References Cited

U.S. PATENT DOCUMENTS 1,702,234  2/1929  Goodridge .............................. 228/207
5,377,961  1/1995  Smith et al. .............................. 266/237

*Primary Examiner*—Patrick Ryan
*Assistant Examiner*—Jeffrey T. Knapp
*Attorney, Agent, or Firm*—Jack V. Musgrove; Andrew J. Dillon

[57] ABSTRACT

A method and system for introducing flux onto at least one surface of a solder pump achieve their objects as follows. A solder pump nozzle is submerged into a flux reservoir. In response to such submersion, the flux in the reservoir is actively introduced into the solder pump nozzle. In one embodiment, the active introduction is achieved by creating a negative pressure in a solder pump nozzle such that flux fills a vacated volume. The created negative pressure is produced by moving a solder column, contained within the solder pump nozzle, under the influence of an applied electric current and an applied magnetic field.

12 Claims, 5 Drawing Sheets

METHOD AND SYSTEM FOR INTRODUCING FLUX ONTO AT LEAST ONE SURFACE OF A SOLDER PUMP

BACKGROUND OF THE INVENTION

1. Field of the Invention

The present invention relates, in general, to a method and system for use with solder pumps. Specifically, the present invention relates to a method and system, for use with solder pumps, which provide the active introduction of flux onto one or more solder pump nozzle interfaces.

2. Description of Related Art

An integrated circuit is a device consisting of a number of connected circuit elements, such as transistors and resistors, fabricated on a single chip of silicon crystal or other semiconductor material. Integrated circuits are normally fabricated in "chips" constructed from "wafers" of semiconductor material. A "chip" is a minute piece of material cut from a single crystal on which electronic circuit active and passive elements are mounted, usually by etching, deposition, and diffusion processes, to form an integrated circuit. A "wafer" is a thin slice of a suitable semiconductor, such as a silicon or germanium crystal, on which microcircuits are constructed by using various techniques, such as diffusion, etching, and evaporative deposition of dopants. Chips are constructed from a wafer by constructing a large number of microcircuits on a wafer and then scoring and breaking the wafer into chips, also referred to as "dice." An individual chip can thus been referred to as a "die."

After fabrication, the integrated circuits are generally utilized to perform a function in some overall system (for example, Application Specific Integrated Circuits are now being utilized to perform many specialized features in network server computers). In order to function with other circuit components in such an overall system, the integrated circuits must communicate with those other circuit components. Such communication is typically achieved via conducting paths laid out on what is known as a printed circuit board.

A printed circuit board is typically a flat board made of material on which integrated circuit packages are mounted, typically by either what is known as surface-mount technology, or by what is known as pin-through-hole technology. The surface-mounted electronic packages are connected electrically, and thus communicate, by predefined conductive metal pathways that are printed on the surface of the board. The integrated circuit packages have protruding metal leads which function as input/output (I/O) connections to the integrated circuits and which are soldered to the conductive metal pathways of the printed circuit board.

Integrated circuit packages, and in particular those utilized in digital electronic systems such as personal computers, have significant size constraints associated with them (e.g., those utilized with notebook computers). Such integrated circuits have been undergoing significant increases in functionality with successive design generations. The size constraints typically associated with integrated circuits, in combination with functionality increases, have resulted in an ever increasing number of integrated circuit devices being built into packages of constrained size.

The increasing number of integrated circuit devices being built into packages of constrained size has resulted in a correspondingly greater number of I/O connections to and from the chip being spaced closer and closer together. The associated decreases in the dimensions of integrated circuit package interconnections have had a direct effect on the wiring and interconnect patterns of printed circuit boards.

Conventional techniques for solder bonding integrated circuit device packages to printed circuit boards are either approaching their technology limits or proving to be expensive to implement with the small dimensions typical of advanced designs. The prevailing technology, stencil printing of solder paste on printed circuit boards, is at its limits while the prevailing alternative technique, forming solder deposits on printed circuit boards by plating, is relatively expensive.

An analogous situation applies to the formation of solder deposit arrays on an integrated circuit die, such as with flip-chip devices, or on integrated circuit packages. The reflow connection of solder balls or solder columns onto integrated circuit dice or packages is likewise a complex and expensive endeavor. Furthermore, the advent of flip-chip and chip-scale-packaging technologies are stretching the limits of standard surface-mount technology, and is complicating the existing infrastructure for such surface-mount technology.

Thus, there has been developed a surge of interest in dispensing or jetting molten solder directly onto integrated circuit dice (individually or in wafer form), integrated circuit packages, and printed circuit boards. There are numerous advantages to the use of a solder droplet dispensing or jetting technology when the quality of the molten solder droplets can be controlled in volume and deposit location. The ability to accurately locate the molten solder droplets as deposited on a substrate has proved to be a manageable task. However, the realization of a molten solder dispensing system which is reliable enough for a manufacturing application, to the extent that the molten solder droplets are consistent in volume and formation has yet to be fully realized.

One highly innovative advance in the area was the International Business Machines Corporation's Electrodynamic Pump for Dispensing Molten Solder (disclosed in U.S. Pat. No. 5,377,961 which is hereby incorporated by reference in its entirety). In general, this pump uses a programmable current source to place an electric current through the liquid solder as it is flowing through a conduit. Additionally, a magnet or magnetic coil is disposed adjacent the conduit in order to provide a magnetic field in the same plane as the electric current. The conduit supplies liquid solder to a nozzle which then deposits a droplet of solder onto a printed circuit board, or the like. The magnetic coil and current source are disposed such that the plane in which the magnetic field and current vector lie is perpendicular to the axial direction of the conduit with the liquid solder therein. Therefore, as the current is applied, in a first direction through the solder, a force is exerted on the solder in a direction consistent with the "right hand rule". Conversely, if the direction of the current is reversed, then the direction of the force exerted on the solder is also reversed. Therefore, those skilled in the art will appreciate how the present invention is capable of substantially instantaneously reversing the force exerted on the solder, by selectively alternating the current therethrough. Further, it can be seen that by reversing the force exerted on the solder, immediately subsequent to applying a force exerted on the solder to urge it outwardly from the nozzle, an extremely small droplet of solder can be dispensed from the nozzle and deposited on a PCB, or the like.

Though early tests established the viability of the electrodynamic pump for dispensing molten solder droplets, evaluation in a manufacturing setting, where repeatability of droplet dispensing, and consistency and stability of droplet size are crucial, indicated that refinements were needed. In this regard, testing determined that the molten solder located in close proximity to the nozzle aperture did not remain a homogeneous mixture of pure solder with time. Metallurgical analysis of solder ejection nozzle residues and camera analyses of droplet dispensing confirmed that there was a mixture of pure solder and oxidized tin and lead within the nozzle which disrupted the dispensing dynamics, with such combination resulting in the creation of droplets with non-uniform physical properties such as size and volume.

Testing of the electrodynamic solder pump determined that the inner surfaces of the nozzle were dramatically different after a few hours of operation, notwithstanding the consistency of the input parameters which define the pressure of pulses creating the single shot droplets. Further investigation confirmed that the instability was attributable to the non-homogeneous nature of the solder near the nozzle aperture, the non-homogeneous solder being composed of the earlier noted mix of pure solder with oxidized tin and lead (dross).

As a result of the foregoing testing, it was found that in order to achieve the desired small perfectly-formed drops of molten solder, it is essential that the dynamics of formation of the solder droplets be consistent and repeatable, and that the molten solder column inside the pump be free to move with very little viscous drag. It has been found that one of the critical factors in achieving such uniformity, consistency of droplet formation, and such low viscous drag is the keeping of the solder nozzle (or tip) free from dross (a term used to refer to impurities arising from oxidation and/or contamination), which has been found empirically to give rise to irregular, non-repeatable dispensing.

The preferred method of keeping the solder nozzle free from dross is to apply what is known as flux (a substance applied to surfaces to reduce oxides) to the solder nozzle subsequent to the release of a solder drop. The application of such flux is for the purpose of thoroughly coating internal solder nozzle surfaces which are not wetted by molten solder, thereby inhibiting the formation of dross and the collection of other impurities upon such surfaces.

The problem with such application of flux is that present methods and systems do not ensure that the applied flux will indeed thoroughly coat internal nozzle surfaces not wetted by molten solder. Furthermore, present methods and systems of applying such flux are somewhat crude and inelegant, ranging from swabbing the solder nozzle with a swab coated with flux (which in itself can introduce impurities from such swab) to dipping the solder nozzle into some film or reservoir of flux.

Present methods and systems are all crude and inelegant in that they are essentially passive. That is, such methods and systems either place the flux in/on the nozzle, or place the nozzle in/on the flux, and depend on capillary action to pull the flux into crevices and onto critical surfaces internal to and upon the nozzle not covered by initial direct contact with the flux. In other words, as used herein, the term "passive" means that there is no mechanism other than capillary action that draws the flux into the recesses of the nozzle.

It is therefore apparent from the foregoing that a need exists for a method and system which will provide the active application of flux to critical surfaces internal to and upon molten solder nozzles.

SUMMARY OF THE INVENTION

It is therefore one object of the present invention to provide a method and system for use with solder pumps.

It is therefore another object of the present invention to provide a method and system, for use with solder pumps, and which provide the active introduction of flux onto one or more solder pump nozzle interfaces.

The method and system achieve their objects as follows. A solder pump nozzle is submerged into a flux reservoir. In response to such submersion, the flux in the reservoir is actively introduced into the solder pump nozzle. In one embodiment, the active introduction is achieved by creating a negative pressure in a solder pump nozzle such that flux fills a vacated volume. The created negative pressure is produced by moving a solder column, contained within the solder pump nozzle, under the influence of an applied electric current and an applied magnetic field.

The above, as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 1:
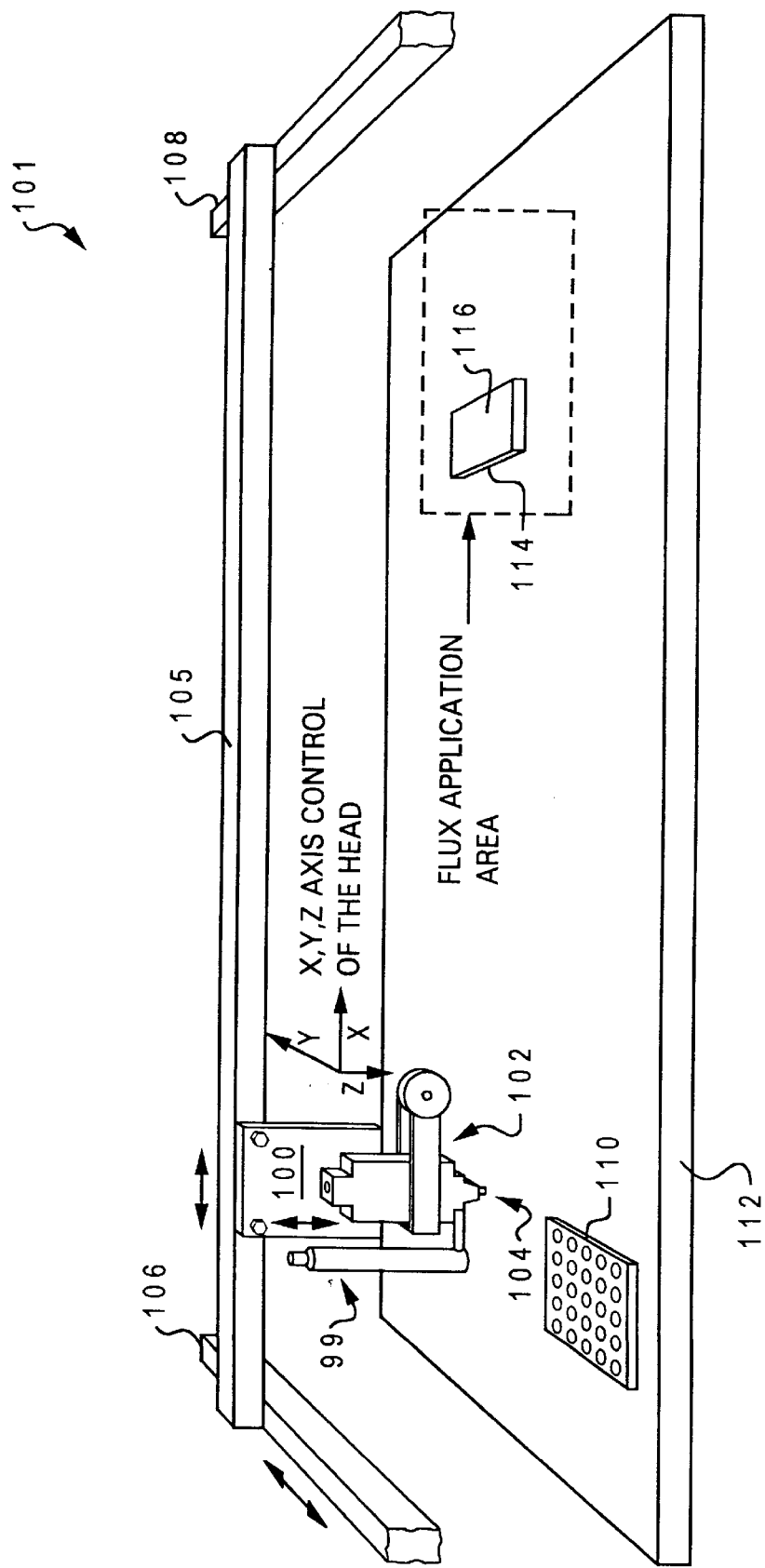
FIG. 1 illustrates a perspective view of an environment wherein one embodiment of the present invention will be practiced.

Refer now to FIG. 1. FIG. 1 is a perspective view of an environment wherein one embodiment of the present invention will be practiced. The environment shown in FIG. 1 consists of a general view of a Electrodynamic Solder Pump (EDSP) system 101. Shown is an EDSP assembly 99 having a z-axis plate 100 and an EDSP head 102, with the EDSP head 102 having a solder nozzle 104 through which solder may be dispensed. As used herein, the term EDSP system is intended to encompass other types of pump systems, including but not limited to solder jet pump systems, positive displacement pump systems, and pneumatic displacement device systems.

EDSP assembly 99 may be positioned along the y-axis via the movement of transverse beam 105 along horizontal beams 106 and 108. EDSP assembly 99 may be positioned along the x-axis via the movement of EDSP head 102 along transverse beam 105. EDSP head 102 may be positioned along the z-axis by movement of EDSP head 102 relative to z-axis plate 100. Thus, provision is made for the movement of solder nozzle 104, via the movement of the EDSP assembly 99 and/or EDSP head 102, in three dimensions (or three degrees of freedom).

Accordingly, EDSP system 101 provides for the precise movement of solder nozzle 104 in three dimensions whereby solder nozzle 104 can provide deposition of solder onto substrate 110 positioned on platform base 112.

Furthermore, and of particular interest in regard to one embodiment of the present invention, EDSP system 101 provides for the movement of solder nozzle 104 to a position over flux reservoir 114 and then subsequently down into flux reservoir 114 whereby flux 116 will be actively applied to said solder nozzle 104 in accord with one embodiment of the present invention, set forth below.

Figure 2:
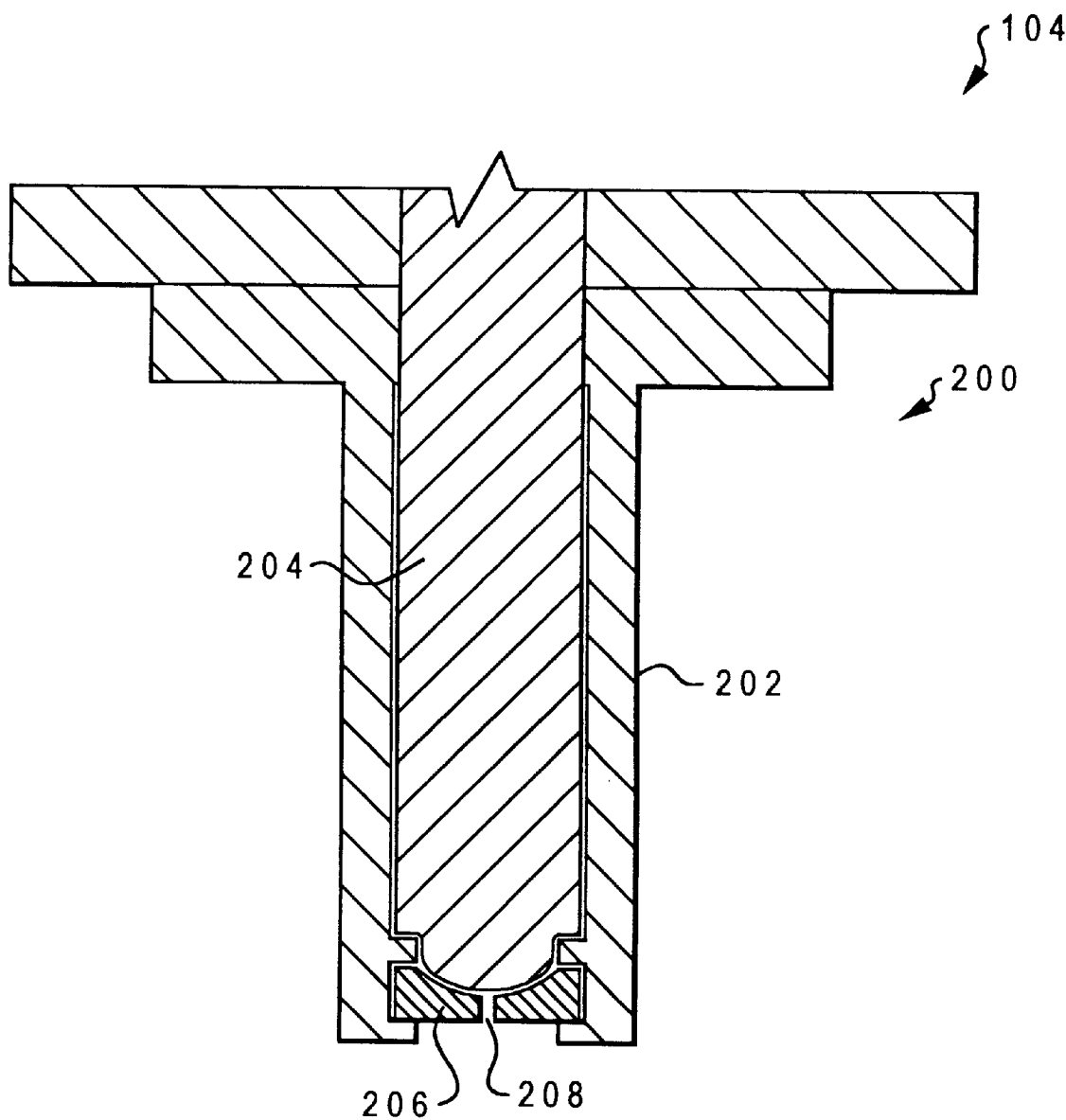
FIG. 2 depicts a front elevational view of a nozzle assembly of a solder nozzle.

Refer now to FIG. 2. FIG. 2 is a front elevational view of a nozzle assembly 200 of solder nozzle 104. Shown is that solder nozzle 104 has nozzle outer sleeve 202 (usually composed of titanium) wherein a solder (usually molten) column 204 is held. Shown is that solder column 204 rests upon nozzle disk 206 having nozzle aperture 208 (in one embodiment, nozzle disk 206 having nozzle aperture 208 is a material capable of having a small accurate orifice). By the operation of EDSP solder pump system 101, solder column 204 can be made to move within, and a solder drop can be made to eject from, solder nozzle 104.

Figure 3:
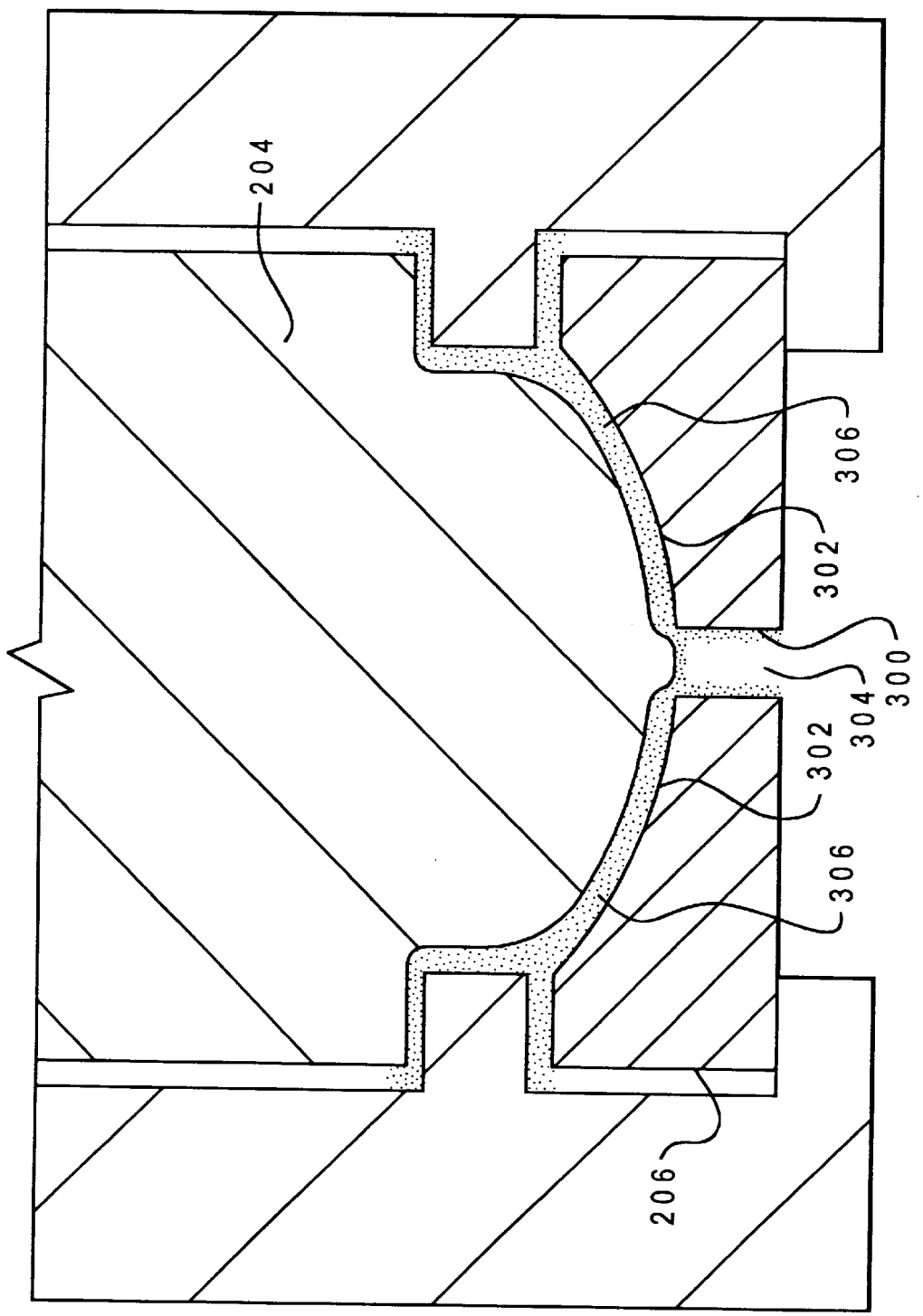
FIG. 3 depicts a front exploded elevational view illustrating the spatial relation of solder column relative to nozzle aperture subsequent to the ejection of a solder drop from a solder nozzle.

Refer now to FIG. 3. FIG. 3 is a front exploded elevational view illustrating the spatial relation of solder column 204 relative to nozzle disk 206 having nozzle aperture 208 subsequent to the ejection of a solder drop from solder nozzle 104. As can be seen, subsequent to the ejection of a solder drop, solder column 204 is distal from inner surfaces 300, 302 of nozzle disk 206 having nozzle aperture 208. Consequently, voids 304, 306 exist internal to solder nozzle 104 where solder column 204 is not resident. Consequently, gaseous materials (e.g., air) or other foreign materials (e.g., dust) can enter and fill voids 304 and 306 and thereby come into contact with inner surfaces 300, 302 and cause oxidation or contribute other forms of dross.

Figure 4:
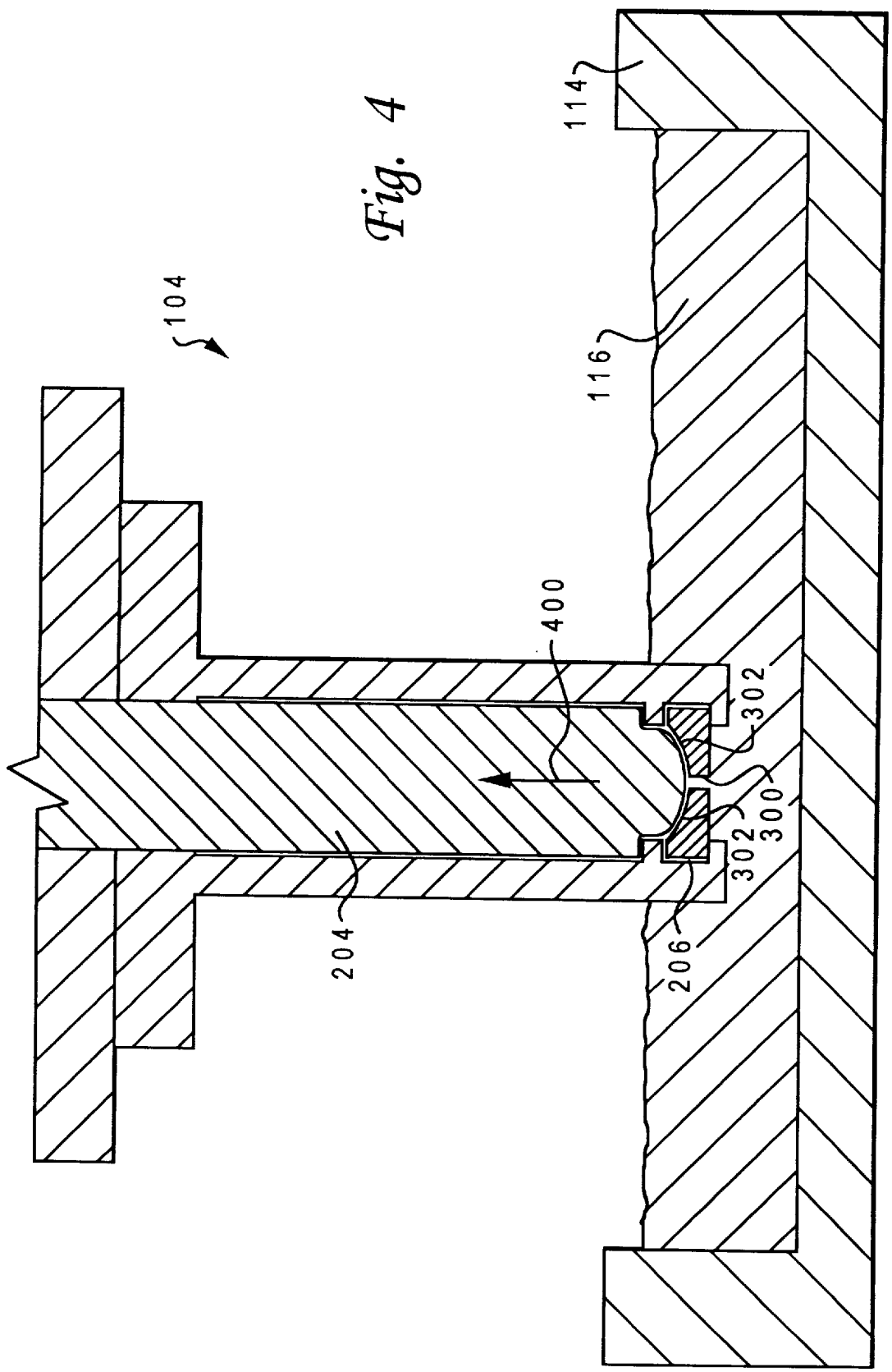
FIG. 4 is a front elevational view illustrating how one embodiment of the present invention actively applies flux to inner surfaces thereby enhancing the reduction of oxides and inhibiting the formation of oxides on inner surfaces.

Refer now to FIG. 4. FIG. 4 is a front elevational view illustrating how one embodiment of the present invention actively applies flux to inner surfaces 300, 302 thereby avoiding the problem of dross forming on inner surfaces 300, 302. Shown is that solder nozzle 104 is placed into flux 116 contained within flux reservoir 114. Thereafter, EDSP solder pump system 101 can be made to operate such that solder column 204 moves, in solder nozzle 104, in a direction away from nozzle disk 206 having nozzle aperture 208, such direction of solder movement illustrated by solder movement direction arrow 400. As solder column 204 moves upward and away from nozzle disk 206 having nozzle aperture 208, a negative pressure is created in the space above nozzle disk 206 having nozzle aperture 208 which has been vacated by the movement of solder column 204 up solder nozzle 104. In response, flux 116 is siphoned into the vacated volume, thereby coating inner surfaces 300, 302 which thereby prevents the problem of dross forming on inner surfaces 300, 302 and reduces existing oxides. Thereafter, EDSP solder pump system 101 can be operated such that solder column 204 is allowed to settle against nozzle disk 206 having nozzle aperture 208, but with a coating of flux 116 on surfaces 300, 302, thereby preventing the formation of dross.

Figure 5:
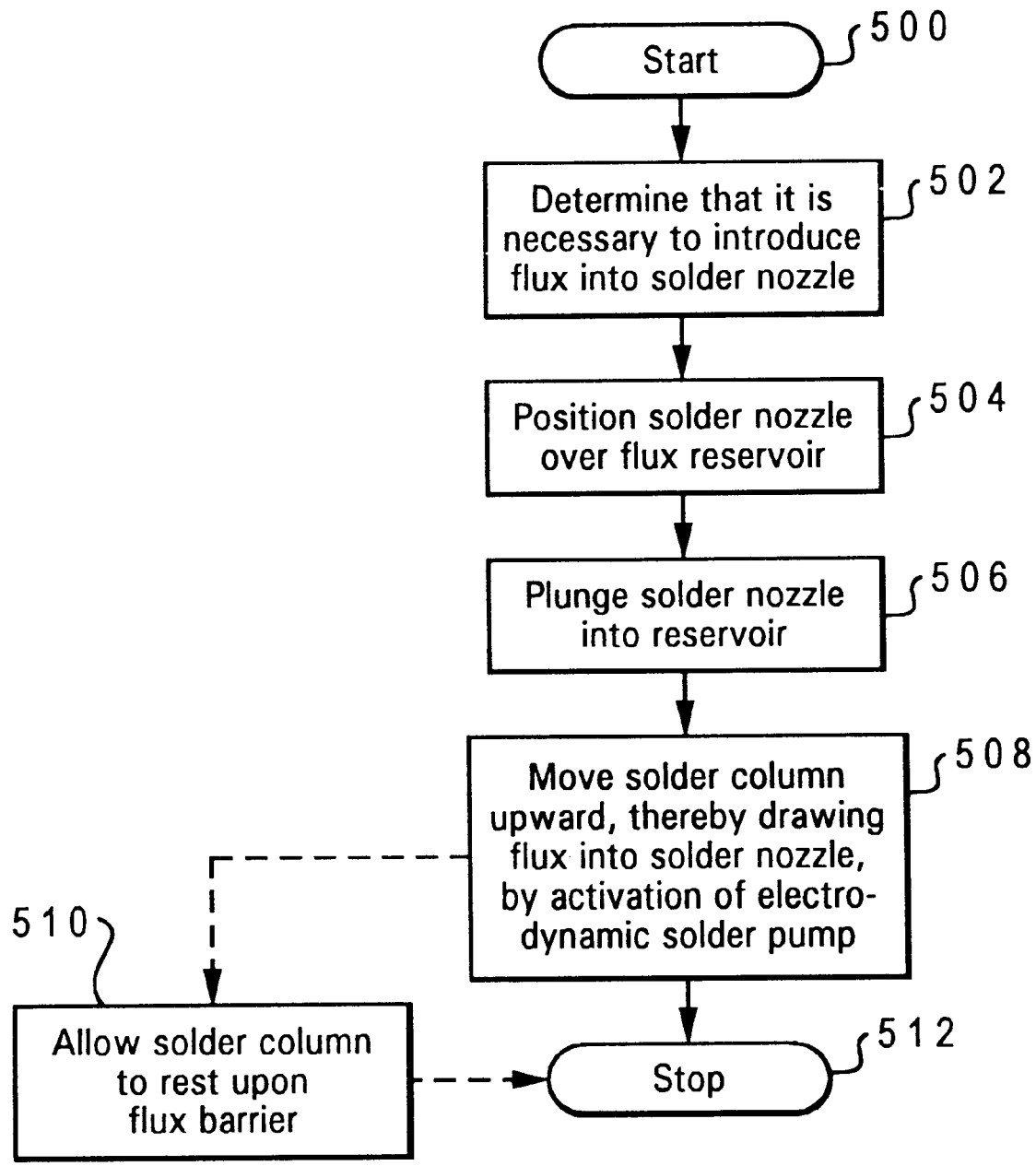
FIG. 5 is a high-level flow chart depicting the method of one embodiment.

Refer now to FIG. 5. FIG. 5 is a high-level flow chart depicting the method of one embodiment. Method step 500 shows the start of the process. Method step 502 shows the determination that it is necessary to introduce flux into solder nozzle 104. (Examples where the introduction of flux might be necessary could be at some time subsequent to the ejection of a solder drop from solder nozzle 104 or subsequent to a decision to store solder nozzle 104 for an extended period of time). Method step 504 depicts that EDSP is then positioned over flux reservoir 114. Thereafter, method step 506 illustrates that solder nozzle 104 is plunged into flux reservoir 114. Method step 508 shows that after the tip of solder nozzle 104 has been submerged in flux reservoir 114, EDSP solder pump system 101 is operated, causing solder column 204 to move upward and away from nozzle disk 206 having nozzle aperture 208, thereby siphoning flux into solder nozzle 104. Method step 510 shows the step of operating EDSP solder pump 101 in such a fashion that solder column 204 is allowed to move back down and rest upon the flux barrier covering surface 300, 302. Method step 512 shows the end of the process.

While the invention has been shown and described with reference to particular embodiments thereof, it will be understood by those skilled in the art that the foregoing and other changes in form and detail may be made therein without departing from the spirit and scope of the invention, which is defined only by the following claims. One such change would be to move the flux reservoir assembly relative to the solder pump nozzle, rather than the solder pump assembly relative to the flux reservoir. This would be achieved by moving the reservoir in 3 degrees of freedom in a fashion similar to that described for positioning an EDSP assembly and/or head.

What is claimed is:

1. A system, for introducing flux onto at least one surface of a solder pump, comprising:
    a solder pump having a solder nozzle;
    a flux reservoir containing flux;
    a solder pump positioning mechanism for positioning said solder nozzle within said flux reservoir; and
    an active introduction mechanism for actively forcing flux into said solder nozzle.

2. The method of claim 1, wherein said solder pump positioning mechanism further includes a mechanism for moving the flux reservoir relative to the solder nozzle.

3. The method of claim 1, wherein said solder pump positioning mechanism further includes a mechanism for moving the solder nozzle relative to the flux reservoir.

4. The system of claim 1, wherein said solder pump further comprises an electrodynamic pump for dispensing molten solder.

5. The system of claim 4, wherein said active introduction mechanism further comprises said electrodynamic pump for dispensing molten solder operated so as to create a negative pressure in said solder nozzle such that flux from said flux reservoir is drawn into a vacated volume.

6. A method for introducing flux onto at least one surface of a solder pump, said method comprising the steps of:
    submersing a solder pump nozzle into a flux reservoir having flux; and
    in response to said step of submersing, actively introducing the flux into the solder pump nozzle.

7. The method of claim 1, wherein said step of actively introducing further comprises actively introducing the flux such that it coats the at least one surface of the solder pump.

8. The method of claim 6, wherein said step of actively introducing further comprises the step of creating a negative pressure in said solder pump nozzle such that the flux fills a vacated volume.

9. The method of claim 8, wherein said step of creating a negative pressure further comprises the step of moving a solder column, contained within the solder pump nozzle, under the influence of an applied electric current and an applied magnetic field.

10. The method of claim 9, further comprising the step of moving the solder column in a direction opposite that required for creation of negative pressure such that the flux forms a barrier between the solder column and the at least one surface of the solder pump.

11. The method of claim 10, wherein said step of moving the solder column in a direction opposite that required for creation of negative pressure further comprises the step of decreasing the intensity of said active introducing.

12. The method of claim 10, wherein said step of moving the solder column in a direction opposite that required for creation of negative pressure further comprises the step of moving a solder column, contained within the solder pump nozzle, under the influence of an applied electric current and an applied electric field.

* * * * *